US011709697B2

(12) United States Patent
Onda et al.

(10) Patent No.: US 11,709,697 B2
(45) Date of Patent: Jul. 25, 2023

(54) VEHICLE CONTROL DEVICE, VEHICLE CONTROL METHOD, AND RECORDING MEDIUM STORING VEHICLE CONTROL PROGRAM

(71) Applicant: TOYOTA JIDOSHA KABUSHIKI KAISHA, Toyota (JP)

(72) Inventors: Yusuke Onda, Tokyo (JP); Takeshi Yamamoto, Kanagawa (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 273 days.

(21) Appl. No.: 16/944,569

(22) Filed: Jul. 31, 2020

(65) Prior Publication Data

US 2021/0064409 A1 Mar. 4, 2021

(30) Foreign Application Priority Data

Sep. 4, 2019 (JP) ................................ 2019-161529

(51) Int. Cl.
*G06F 9/455* (2018.01)
*B60W 50/04* (2006.01)

(52) U.S. Cl.
CPC ......... *G06F 9/45558* (2013.01); *B60W 50/04* (2013.01); *G06F 2009/4557* (2013.01); *G06F 2009/45575* (2013.01); *G06F 2009/45583* (2013.01)

(58) Field of Classification Search
None
See application file for complete search history.

(56) References Cited

U.S. PATENT DOCUMENTS

| 2004/0187126 | A1 | 9/2004 | Yoshimura |
| 2007/0255929 | A1 | 11/2007 | Kasahara et al. |
| 2008/0045206 | A1 | 2/2008 | Takada |
| 2008/0301673 | A1 | 12/2008 | Kawasaki et al. |
| 2009/0070772 | A1 | 3/2009 | Shikano |
| 2010/0146310 | A1 | 6/2010 | Kasahara et al. |
| 2014/0309789 | A1* | 10/2014 | Ricci ........................ G06F 16/25 700/276 |
| 2014/0359356 | A1 | 12/2014 | Aoki |
| 2018/0295011 | A1* | 10/2018 | Wang .................. H04L 41/0833 |
| 2022/0261262 | A1* | 8/2022 | Serizawa ................ G06F 9/505 |

FOREIGN PATENT DOCUMENTS

| JP | 2004252900 A | 9/2004 | |
| JP | 2005-043962 A | 2/2005 | |
| JP | 2006293768 A | 10/2006 | |
| JP | 2008011031 A | 1/2008 | |
| JP | 2009069921 A | 4/2009 | |
| JP | 2011-065241 A | 3/2011 | |
| JP | 2011-198027 A | 10/2011 | |
| JP | 2012-203449 A | 10/2012 | |
| JP | 2013-257789 A | 12/2013 | |
| JP | 2017-142722 A | 8/2017 | |
| JP | 2019-079309 A | 5/2019 | |
| WO | WO-2020047016 A1 * | 3/2020 | ............. G06F 21/53 |

* cited by examiner

*Primary Examiner* — Wynuel S Aquino
*Assistant Examiner* — Melissa A Headly
(74) *Attorney, Agent, or Firm* — Oliff PLC (57) ABSTRACT

A vehicle control device that: judges a state of a vehicle; structures a plurality of VMs that control equipment installed in the vehicle; and in accordance with the state of the vehicle, switches an order of carrying out activation or stoppage of the plurality of VMs.

15 Claims, 9 Drawing Sheets

FIG.3

| ORDER | NAME OF VM | PRIORITY LEVEL | DEPENDENCE DESTINATIONS |
|---|---|---|---|
| 1 | BODY CONTROL VM | High | — |
| 2 | ENGINE CONTROL VM | High | — |
| 3 | AUTOMATIC DRIVING CONTROL VM | Middle | ENGINE CONTROL VM |
| 4 | MULTIMEDIA VM | Low | — |

FIG.4

| STATE | ACTIVATED VMs | STOPPED VMs |
|---|---|---|
| A: VEHICLE OCCUPANT RIDING × VEHICLE PARKED | 1) BODY CONTROL VM<br>2) MULTIMEDIA VM | 3) ENGINE CONTROL VM<br>4) AUTOMATIC DRIVING CONTROL VM |
| B: VEHICLE OCCUPANT RIDING × CURRENTLY RUNNING × AUTOMATIC DRIVING | 1) BODY CONTROL VM<br>2) ENGINE CONTROL VM<br>3) AUTOMATIC DRIVING CONTROL VM<br>4) MULTIMEDIA VM | — |

VEHICLE CONTROL DEVICE, VEHICLE CONTROL METHOD, AND RECORDING MEDIUM STORING VEHICLE CONTROL PROGRAM

CROSS-REFERENCE TO RELATED APPLICATION

This application is based on and claims priority under 35 USC 119 from Japanese Patent Application No. 2019-161529 filed on Sep. 4, 2019, the disclosure of which is incorporated by reference herein.

BACKGROUND

Technical Field

The present disclosure relates to a vehicle control device, a vehicle control method, and a recording medium storing a vehicle control program.

Related Art

Development is being carried out to combine the functions of an ECU (Electronic Control Unit) of a vehicle as software into a single control device. For example, Japanese Patent Application Laid-Open (JP-A) No. 2012-203449 discloses an information processing device that decides upon the priority order of activation of processes, while taking the dependency among the processes into consideration.

A case of plural software, which have the functions of the ECU of a vehicle, being executed by a single control device is realized by structuring VMs (Virtual Machines). However, in this case, there is the concern that the activating of software needed for control of the vehicle will be delayed.

SUMMARY

An aspect of the present disclosure is a vehicle control device that includes: a memory; and a processor that is connected to the memory, wherein the processor is configured to judge a state of a vehicle, structure a plurality of VMs (Virtual Machines) that control equipment installed in the vehicle, and in accordance with the state of the vehicle, switch an order of carrying out activation or stoppage of the plurality of VMs.

DETAILED DESCRIPTION

First Embodiment

Figure 1:
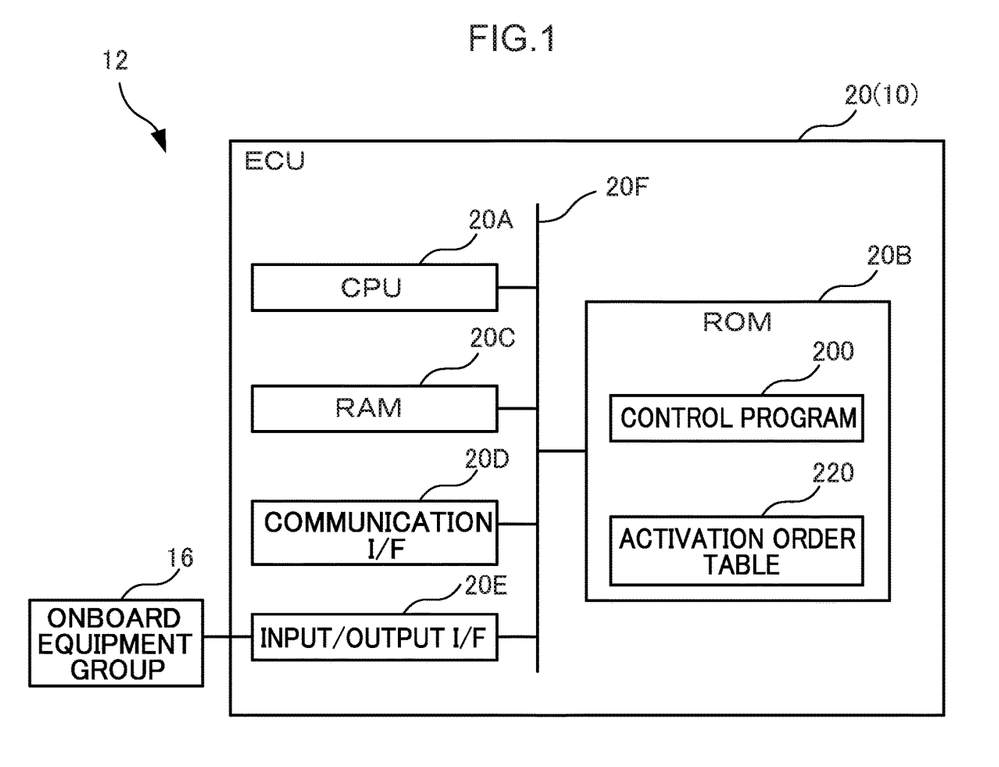
FIG. 1 is a block drawing showing the hardware structures of a vehicle relating to a first embodiment.

FIG. 1 is a block drawing showing a control system of a vehicle 12 relating to a first embodiment.

(Structure)

As shown in FIG. 1, the vehicle 12 relating to the first embodiment is structured to include an ECU (Electronic Control Unit) 20, which serves as a vehicle control device (hereinafter simply called "control device") 10, and an onboard equipment group 16 that is connected to the ECU 20. The onboard equipment group 16 is sensors that are provided at the vehicle 12, and includes sensors that are mounted to respective portions of the vehicle body and respective portions of the engine. Further, the onboard equipment group 16 is devices for driving that are provided at the vehicle 12, and include respective portions of the vehicle body, and the motor, valves and actuators that are installed at respective portions of the engine.

The ECU 20 is structured to include a CPU (Central Processing Unit) 20A, a ROM (Read Only Memory) 20B, a RAM (Random Access Memory) 20C, a communication I/F (InterFace) 20D, and an input/output I/F (InterFace) 20E. The CPU 20A, the ROM 20B, the RAM 20C, the communication I/F 20D and the input/output I/F 20E are connected via a bus 20F so as to be able to communicate with one another.

The CPU 20A is a central computing processing unit, and executes various types of programs and controls respective sections. Namely, the CPU 20A reads-out programs from the ROM 20B, and executes the programs by using the RAM 20C as a workspace. In the present embodiment, plural CPUs 20A may be provided (multiprocessor), or plural cores may be provided at the CPU 20A (multicore).

The ROM 20B stores various types of programs and various types of data. A control program 200 is stored in the ROM 20B of the present embodiment. The control program 200 is a program for carrying out activation processing that is described later. Further, an activation order table 220 that is described later is stored in the ROM 20B.

The RAM 20C, as a workspace, temporarily stores programs and data.

The communication I/F 20D is an interface for connection with other devices that are provided at the vehicle 12. Communication standards in accordance with a CAN (Controller Area Network), Ethernet, or the like are used for this interface.

The input/output IF 20E is an interface for communication with the onboard equipment group 16 that is installed in the vehicle 12.

Figure 2:
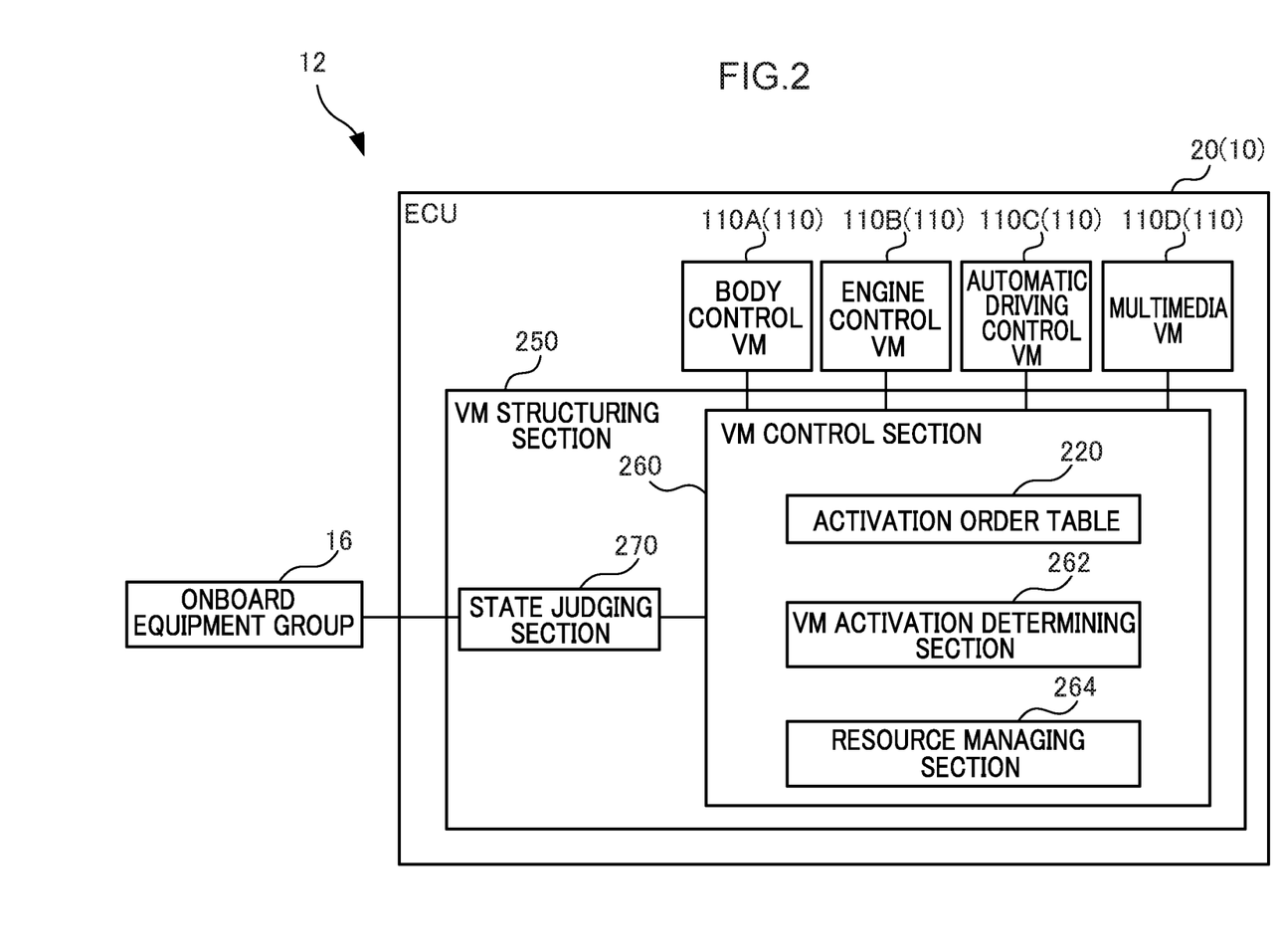
FIG. 2 is a block drawing showing an example of the functional structures of the vehicle of the first embodiment.

FIG. 2 is a block drawing showing an example of the functional structures of the ECU 20. The respective functional structures are realized by the CPU 20A loading the control program 200, which is stored in the ROM 20B, and executing the control program 200.

As shown in FIG. 2, the ECU 20 has four VMs (Virtual Machines) 110 and a VM structuring section 250. The VMs 110 include a body control VM 110A, an engine control VM 110B, an automatic driving control VM 110C, and a multimedia VM 110D. Here, the engine control VM 110B is an example of one VM, and the automatic driving control VM 110C is an example of another VM. Note that the VMs 110 that are realized at the ECU 20 are not limited to these, and VMs 110 corresponding to uses may be further included.

The VM structuring section 250 has the function of virtually structuring the respective VMs 110. This VM structuring section 250 is realized by a so-called hypervisor function. The VM structuring section 250 further includes a VM control section 260 and a state judging section 270 that serves as the judging section.

The VM control section 260 has the function of controlling the assignation of the order of activating or ending the respective VMs 110, and the resources of the CPU 20A. The VM control section 260 further includes the activation order table 220, a VM activation determining section 262 and a resource managing section 264.

Figure 3:
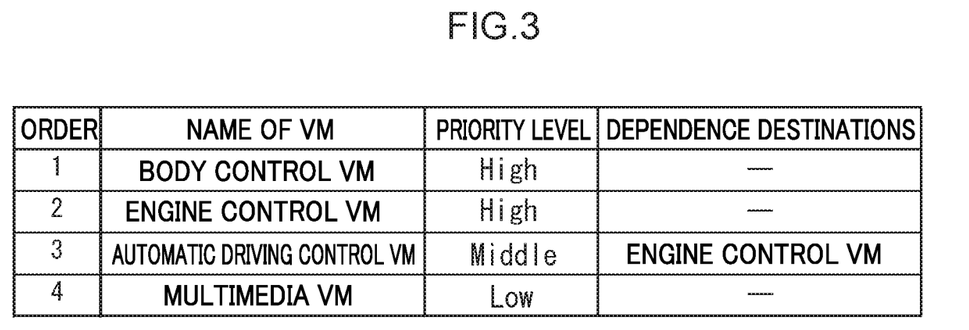
FIG. 3 is a drawing showing an example of an activation order table at a control device of the vehicle of the first embodiment.

As shown in FIG. 3, the activation order table 220 is a table that prescribes the activation order of the respective VMs 110 in a case in which the respective VMs 110 are activated. This ordering is such that, the more important the VM 110 is to the running the vehicle 12, i.e., the higher the priority level of the VM 110, the higher the order given thereto. For example, the priority levels of the body control VM 110A and the engine control VM 110B that are essential to running the vehicle 12 are set to be High, and the priority level of the automatic driving control VM 110C, which is for realizing automatic driving that is an additional function, is set to be Middle. Further, the priority level of the multimedia VM 110D that is directly unrelated to running the vehicle 12 is set to be Low.

Moreover, the relationships of dependence of each of the VMs 110 are prescribed in the activation order table 220. For example, as shown in FIG. 3, the automatic driving control VM 110C depends on the engine control VM 110B. Namely, in a case in which automatic driving is carried out, the engine control VM 110B must be activated before the automatic driving control VM 110C is activated.

Figure 4:
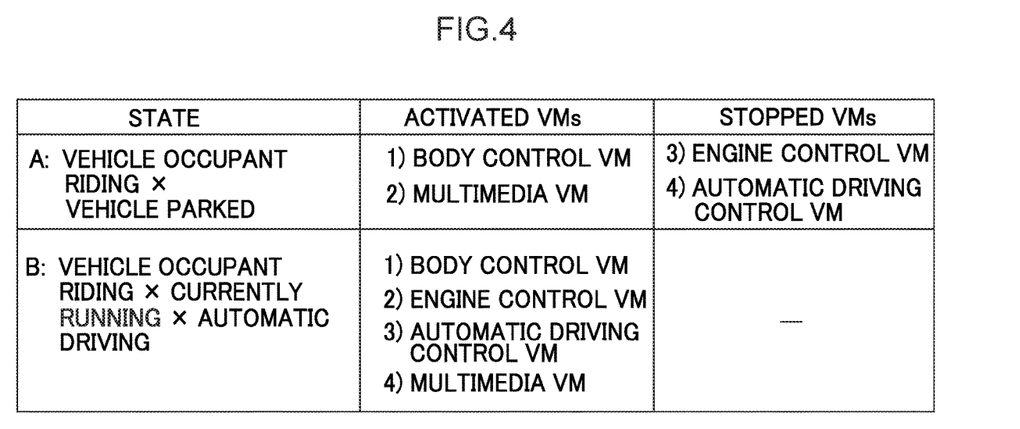
FIG. 4 is a drawing that explains states of the vehicle and VMs that are to be activated or stopped, in the first embodiment.

The VM activation determining section 262 has the function of determining, in accordance with the state of the vehicle 12, whether to activate or stop the respective VMs 110. In detail, on the basis of the state of the vehicle 12 that is judged by the state judging section 270 that is described later, the VM activation determining section 262 determines whether to activate or to stop each VM 110. For example, as shown in FIG. 4, when the state of the vehicle 12 is state A that is "vehicle occupant riding" and "vehicle parked", it is judged that the body control VM 110A and the multimedia VM 110D are to be activated, and the engine control VM 110B and the automatic driving control VM 110C are to be stopped. Further, for example, when the state of the vehicle 12 is state B that is "vehicle occupant riding" and "currently running" and "automatic driving", it is determined that all of the body control VM 110A, the engine control VM 110B, the automatic driving control VM 110C and the multimedia VM 110D are to be activated.

The resource managing section 264 has the function of carrying out managing of the resources of the CPU 20A that are assigned to the respective VMs 110. The resource managing section 264 assigns, to the respective VMs 110, resources that are other than the resources needed for execution of the VM structuring section 250 and the VM control section 260.

The state judging section 270 has the function of judging the state of the vehicle 12 on the basis of information of the onboard equipment group 16. States of the vehicle 12 include a vehicle occupant riding state, a running state, a driving state, and the like. The vehicle occupant riding state includes the categories of "vehicle occupant riding" and "empty vehicle" that are determined on the basis of information of an onboard camera and seating sensors and the like that are included in the onboard equipment group 16. The running state includes the categories of "currently running" and "vehicle parked" that are judged on the basis of information of a vehicle speed sensor and the like that are included in the onboard equipment group 16. The driving state includes the categories of "automatic driving" and "manual driving" that are judged on the basis of a steering angle sensor and a throttle position sensor and the like that are included in the onboard equipment group 16.

(Flow of Control)

Figure 5:
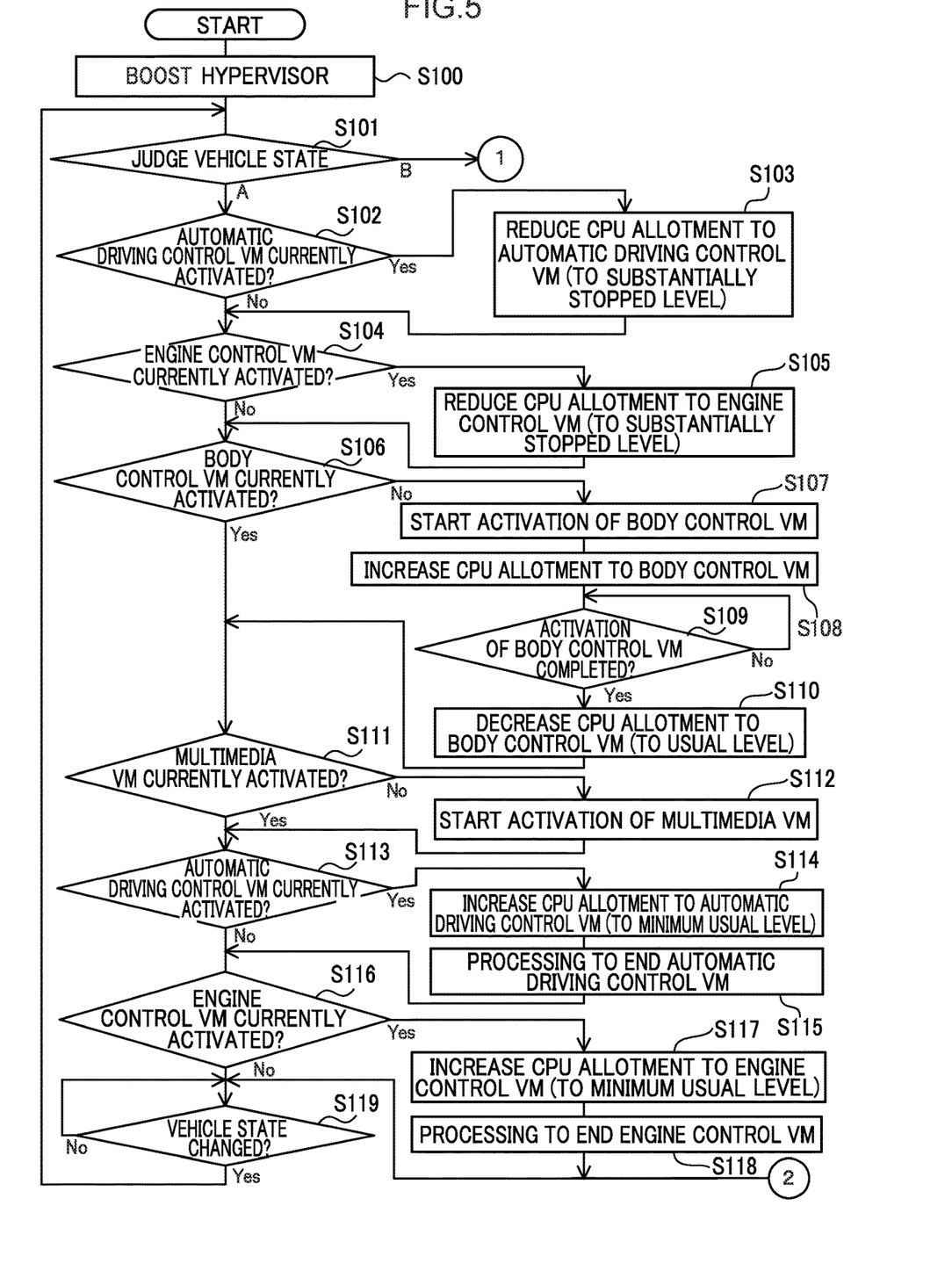
FIG. 5 is a flowchart showing the flow of activation processing in the first embodiment.
Figure 6:
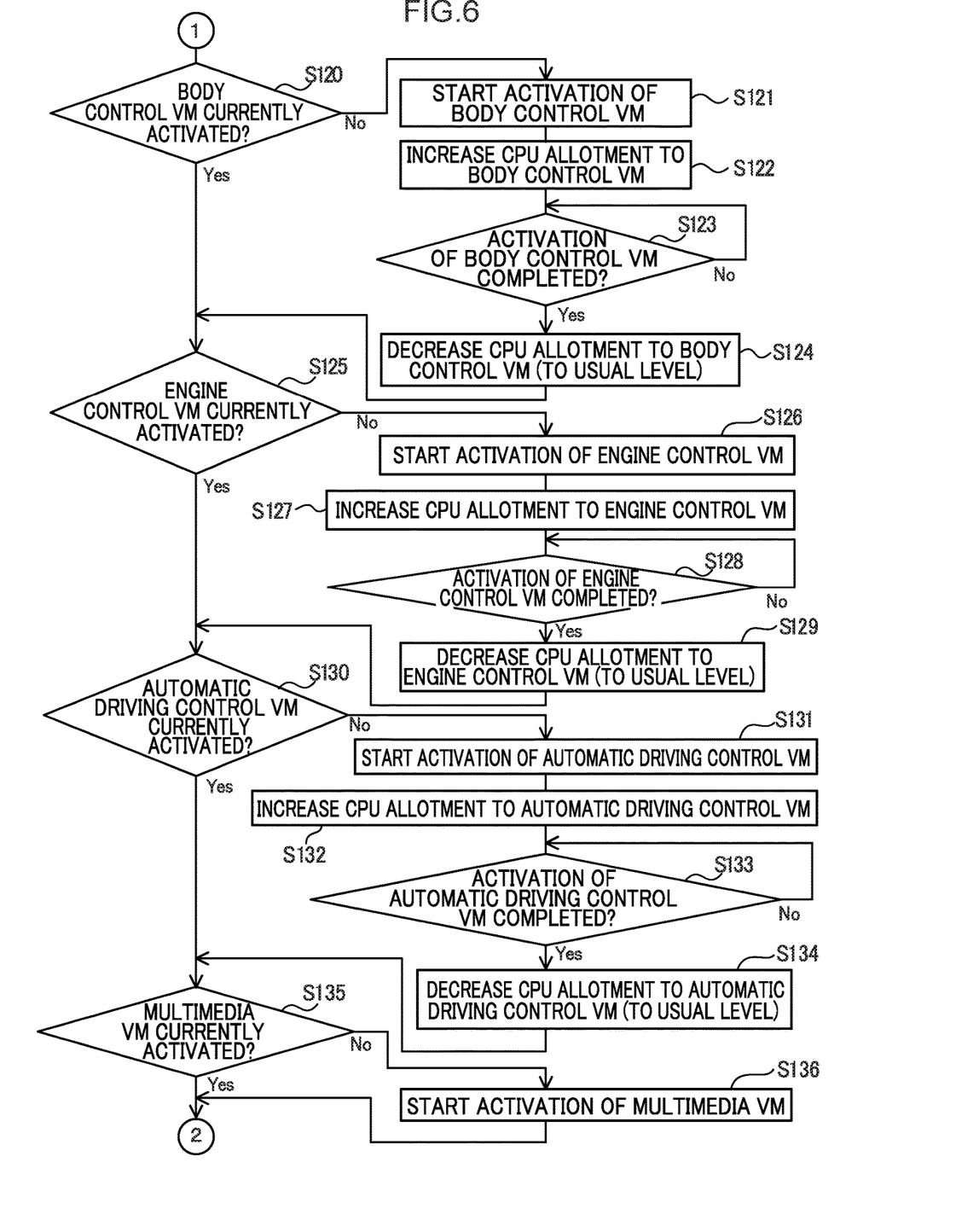
FIG. 6 is a flowchart (the continuation of FIG. 5) showing the flow of activation processing in the first embodiment.

An example of the flow of activation processings that the ECU 20 executes in the present embodiment is described in the flowcharts of FIG. 5 and FIG. 6.

In step S100 of FIG. 5, the CPU 20A, as the structuring step, boosts the hypervisor that is software. The respective VMs 110 that are virtualized are thereby structured.

In step S101, the state judging section 270 judges the state of the vehicle 12, as the judging step. If the state judging section 270 judges that the state of the vehicle 12 is state A (see FIG. 4), the routine moves on to step S102. On the other hand, if the state judging section 270 judges that the state of the vehicle 12 is state B (see FIG. 4), the routine moves on to step S120.

Note that, when, as a result of the judging step that is step S101, the state of the vehicle 12 is judged, a switching step is executed next. In the case in which the state of the vehicle 12 is state A, in the switching step, the order of processings is decided upon by the order and the dependence destinations that are defined in the activation order table 220, and whether the determination by the VM activation determining section 262 is activate or stop. In the case of state A, processings are executed in the order of the automatic driving control VM 110C, the engine control VM 110B, the body control VM 110A, the multimedia VM 110D, the automatic driving control VM 110C, the engine control VM 110B, as shown in step S102 through step S118.

In step S102, the VM control section 260 judges whether or not the automatic driving control VM 110C is currently activated. If the VM control section 260 judges that the automatic driving control VM 110C is currently activated, the routine moves on to step S103. On the other hand, if the VM control section 260 judges that the automatic driving control VM 110C is not currently activated, i.e., is currently stopped, the routine moves on to step S104.

In step S103, the resource managing section 264 decreases the allotment of resources of the CPU 20A to the automatic driving control VM 110C to the level of substantial stoppage. Then, the routine moves on to step S104.

In step S104, the VM control section 260 judges whether or not the engine control VM 110B is currently activated. If the VM control section 260 judges that the engine control VM 110B is currently activated, the routine moves on to step S105. On the other hand, if the VM control section 260 judges that the engine control VM 110B is not currently activated, i.e., is currently stopped, the routine moves on to step S106.

In step S105, the resource managing section 264 decreases the allotment of resources of the CPU 20A to the engine control VM 110B to the level of substantial stoppage. Then, the routine moves on to step S106.

In step S106, the VM control section 260 judges whether or not the body control VM 110A is currently activated. If the VM control section 260 judges that the body control VM 110A is currently activated, the routine moves on to step S111. On the other hand, if the VM control section 260 judges that the body control VM 110A is not currently activated, i.e., is currently stopped, the routine moves on to step S107.

In step S107, the VM control section 260 starts activation of the body control VM 110A.

In step S108, the resource managing section 264 increases the allotment of resources of the CPU 20A to the body control VM 110A.

In step S109, the VM control section 260 judges whether or not the body control VM 110A has been activated. If the VM control section 260 judges that the body control VM 110A has been activated, the routine moves on to step S110. On the other hand, if the VM control section 260 judges that the body control VM 110A has not been activated, step S109 is repeated.

In step S110, the resource managing section 264 decreases the allotment of resources of the CPU 20A to the body control VM 110A to the usual level. Then, the routine moves on to step S111.

In step S111, the VM control section 260 judges whether or not the multimedia VM 110D is currently activated. If the VM control section 260 judges that the multimedia VM 110D is currently activated, the routine moves on to step S113. On the other hand, if the VM control section 260 judges that the multimedia VM 110D is not currently activated, i.e., is currently stopped, the routine moves on to step S112.

In step S112, the VM control section 260 starts activation of the multimedia VM 110D. Then, the routine moves on to step S113.

In step S113, the VM control section 260 judges whether or not the automatic driving control VM 110C is currently activated. If the VM control section 260 judges that the automatic driving control VM 110C is currently activated, the routine moves on to step S114. On the other hand, if the VM control section 260 judges that the automatic driving control VM 110C is not currently activated, i.e., is currently stopped, the routine moves on to step S116.

In step S114, the resource managing section 264 increases the allotment of resources of the CPU 20A to the automatic driving control VM 110C to the minimum level that enables usual processing.

In step S113, the VM control section 260 carries out the processing of ending the automatic driving control VM 110C. Then, the routine moves on to step S116.

In step S116, the VM control section 260 judges whether or not the engine control VM 110B is currently activated. If the VM control section 260 judges that the engine control VM 110B is currently activated, the routine moves on to step S117. On the other hand, if the VM control section 260 judges that the engine control VM 110B is not currently activated, i.e., is currently stopped, the routine moves on to step S119.

In step S117, the resource managing section 264 increases the allotment of resources of the CPU 20A to the engine control VM 110B to the minimum level that enables usual processing.

In step S118, the VM control section 260 carries out the processing of ending the engine control VM 110B. Then, the routine moves on to step S119.

In step S119, the state judging section 270 judges the state of the vehicle 12. If the state judging section 270 judges that the state of the vehicle 12 has changed, the routine returns to step S101. On the other hand, if the state judging section 270 judges that the state of the vehicle 12 has not changed, step S119 is repeated. Namely, the routine stands-by until the state of the vehicle 12 changes.

On the other hand, if the state of the vehicle 12 is state B, the switching step is carried out in accordance with the order that is defined in the activation order table 220. In the case of state B, processings are executed in the order of the body control VM 110A, the engine control VM 110B, the automatic driving control VM 110C, the multimedia VM 110D, as shown in step S120 through step S136 of FIG. 6.

In step S120, the VM control section 260 judges whether or not the body control VM 110A is currently activated. If the VM control section 260 judges that the body control VM 110A is currently activated, the routine moves on to step S125. On the other hand, if the VM control section 260 judges that the body control VM 110A is not currently activated, i.e., is currently stopped, the routine moves on to step S121.

In step S121, the VM control section 260 starts activation of the body control VM 110A.

In step S122, the resource managing section 264 increases the allotment of resources of the CPU 20A to the body control VM 110A.

In step S123, the VM control section 260 judges whether or not the body control VM 110A has been activated. If the VM control section 260 judges that the body control VM 110A has been activated, the routine moves on to step S124. On the other hand, if the VM control section 260 judges that the body control VM 110A has not been activated, step S123 is repeated.

In step S124, the resource managing section 264 decreases the allotment of resources of the CPU 20A to the body control VM 110A to the usual level. Then, the routine moves on to step S125.

In step S125, the VM control section 260 judges whether or not the engine control VM 110B is currently activated. If the VM control section 260 judges that the engine control VM 110B is currently activated, the routine moves on to step S130. On the other hand, if the VM control section 260 judges that the engine control VM 110B is not currently activated, i.e., is currently stopped, the routine moves on to step S126.

In step S126, the VM control section 260 starts activation of the engine control VM 110B.

In step S127, the resource managing section 264 increases the allotment of resources of the CPU 20A to the engine control VM 110B.

In step S128, the VM control section 260 judges whether or not the engine control VM 110B has been activated. If the VM control section 260 judges that the engine control VM 110B has been activated, the routine moves on to step S129. On the other hand, if the VM control section 260 judges that the engine control VM 110B has not been activated, step S128 is repeated.

In step S129, the resource managing section 264 decreases the allotment of resources of the CPU 20A to the engine control VM 110B to the usual level. Then, the routine moves on to step S130.

In step S130, the VM control section 260 judges whether or not the automatic driving control VM 110C is currently activated. If the VM control section 260 judges that the automatic driving control VM 110C is currently activated, the routine moves on to step S135. On the other hand, if the VM control section 260 judges that the automatic driving control VM 110C is not currently activated, i.e., is currently stopped, the routine moves on to step S131.

In step S131, the VM control section 260 starts activation of the automatic driving control VM 110C.

In step S132, the resource managing section 264 increases the allotment of resources of the CPU 20A to the automatic driving control VM 110C.

In step S133, the VM control section 260 judges whether or not the automatic driving control VM 110C has been activated. If the VM control section 260 judges that the automatic driving control VM 110C has been activated, the routine moves on to step S134. On the other hand, if the VM control section 260 judges that the automatic driving control VM 110C has not been activated, step S133 is repeated.

In step S134, the resource managing section 264 decreases the allotment of resources of the CPU 20A to the automatic driving control VM 110C to the usual level. Then, the routine moves on to step S135.

In step S135, the VM control section 260 judges whether or not the multimedia VM 110D is currently activated. If the VM control section 260 judges that the multimedia VM 110D is currently activated, the routine moves on to step S119. On the other hand, if the VM control section 260 judges that the multimedia VM 110D is not currently activated, i.e., is currently stopped, the routine moves on to step S136.

In step S136, the VM control section 260 starts activation of the multimedia VM 110D. Then, the routine moves on to step S119.

Summary of First Embodiment

The plural VMs 110 that are virtualized by the VM structuring section 250 are structured in the control device 10 of the present embodiment. Equipment (the onboard equipment group 16) that are installed in the vehicle 12 are controlled by the respective VMs 110. In this control device 10, the VM control section 260 switches the order of carrying out activation or stoppage of the plural VMs 110, in accordance with the state of the vehicle 12 that is judged by the state judging section 270.

For example, in a case in which the vehicle 12 is in state B, and the respective VMs 110 that are currently stopped are to be activated respectively, at the control device 10, activation is carried out in accordance with the order that is prescribed in the activation order table 220 (refer to step S120 through step S136 of FIG. 6). On the other hand, if the vehicle 12 is in state A, and some of the VMs 110 are to be ended, at the control device 10, the activation or the stoppage is carried out in accordance with an order that takes into consideration the relationships of dependence of the VMs 110, and the order of the VMs 110 that increases/decreases the resources of the CPU 20A (refer to step S102 through step S118 of FIG. 5).

By switching the order in which activating or stopping of the VMs 110 is carried out, the control device 10 of the present embodiment can prioritarily activate the VM 110 that is important in controlling the vehicle 12, e.g., the body control VM 110A. Namely, in accordance with the present embodiment, by, in accordance with the state of the vehicle 12, switching the VM 110 whose activation is to be prioritized, delay of the VM 110 that is important in controlling the vehicle 12 can be suppressed.

Further, if there exists another VM 110 that depends on one VM 110, the control device 10 of the present embodiment carries out control such that the another VM 110 is not activated while the one VM 110 is still in a stopped state. In detail, in the present embodiment, control is carried out such that, while the engine control VM 110B that is the one VM 110 is in a stopped state, the automatic driving control VM 110C that is the another VM 110 is not activated. Namely, in the present embodiment, if the engine control VM 110B is to be activated or is to be stopped, because the automatic driving control VM 110C is stopped, the activation time or deactivation time for the engine control VM 110B can be shortened.

Further, in the control device 10 of the present embodiment, in state A that does not necessitate activation of the engine control VM 110B and the automatic driving control VM 110C, the processings of ending the engine control VM 110B and the automatic driving control VM 110C are postponed. At this time, the resources of the CPU 20A are decreased at the engine control VM 110B and the automatic driving control VM 110C whose endings are postponed. Due thereto, the processings relating to the activation of the body control VM 110A and the multimedia VM 110D, which are currently stopped, being affected by the processings of the engine control VM 110B and the automatic driving control VM 110C, whose endings are postponed, is suppressed. Namely, in accordance with the present embodiment, the processing time relating to the activation of the body control VM 110A and the multimedia VM 110D that are to be activated, and in particular, the body control VM 110A that is important to the running the vehicle 12, can be shortened.

Further, in the control device 10 of the present embodiment, the resources of the CPU 20A, which have been assigned to the engine control VM 110B and the automatic driving control VM 110C for which processings relating to ending have been postponed, can be distributed to the body control VM 110A for which processing relating to activation is to be carried out. Accordingly, in accordance with the present embodiment, the processing time of the body control VM 110A that is to be activated can be shortened.

Note that the changing of the allotment of resources relating to the CPU 20A is carried out only by operation of the VM structuring section 250 that functions as a hypervisor, and there is little consumption of the resources of the CPU 20A at the control device 10 on the whole. Further, because the multimedia VM 110D is not activated until activation of the body control VM 110A has been completed, resources, which were to be used for the multimedia VM 110D, also can be assigned to the body control VM 110A. Namely, the resources of the CPU 20A that are assigned to the body control VM 110A can be increased as much as possible, and further shortening of the activation time can be realized. Further, after the processing of activating the body control VM 110A is completed, due to a notification of completion of activation being given from the body control VM 110A to the VM control section 260, the allotment of resources to the body control VM 110A is changed to the level of usual operation.

Moreover, in the control device 10 of the present embodiment, in a case of activating the multimedia VM 110D that does not affect running the vehicle 12, the VM control section 260 executes the activation or stoppage relating to the VM that is next in order, without waiting for completion of the activation of the multimedia VM 110D. Namely, for the multimedia VM 110D that does not affect running the vehicle 12, processing is carried out in parallel with the processings of ending the engine control VM 110B and the automatic driving control VM 110C, and due thereto, the time until all of the processings are completed can be shortened.

Second Embodiment

In the first embodiment, the VM control section 260 is provided at the VM structuring section 250 that functions as a hypervisor. In contrast, the second embodiment differs from the first embodiment with regard to the point that the VM control section 260 is structured at one of the VMs 110. The point that differs from the first embodiment is described hereinafter. Note that the same structures are denoted by the same reference numerals, and description thereof is omitted.

Figure 7:
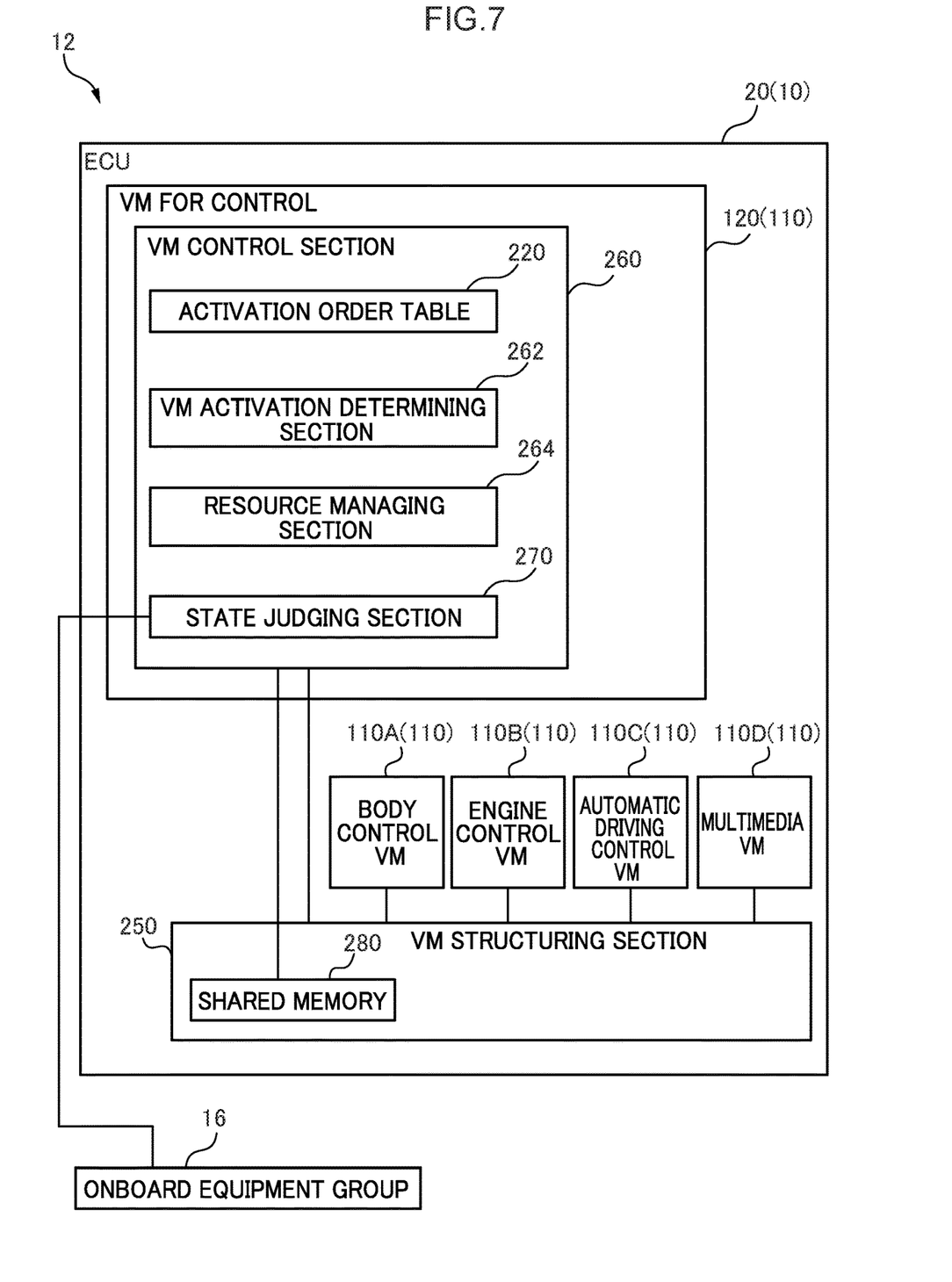
FIG. 7 is a block drawing showing an example of the functional structures of the vehicle of a second embodiment.

As shown in FIG. 7, in the ECU 20 of the present embodiment, the VMs 110 include a VM 120 for control, in addition to the body control VM 110A, the engine control VM 110B, the automatic driving control VM 110C and the multimedia VM 110D. In the present embodiment, the VM 120 for control has the VM control section 260. The VM structuring section 250 treats the VM 120 for control as a special VM 110, and handles it as a structure that is different from the other VMs 110, and activates the VM 120 for control immediately after boosting the hypervisor.

Further, the state judging section 270 of the present embodiment is provided within the VM control section 260. On the other hand, a shared memory 280 that is a portion of the RAM 20C is provided at the VM structuring section 250. The shared memory 280 shares information relating to the respective VMs 110 (the body control VM 110A, the engine control VM 110B, the automatic driving control VM 110C and the multimedia VM 110D) with the VM structuring section 250 and the VM control section 260. The instructing, from the VM control section 260 to the VM structuring section 250, to activate and end the respective VMs 110 (the VM 110A through the VM 110D) is carried out by communication at the interior of the ECU 20.

Operation and effects that are similar to those of the first embodiment can be obtained in the present embodiment as well.

Third Embodiment

The third embodiment differs from the first embodiment with regard to the point that the state judging section 270 is provided at another ECU 20. The point that differs from the first embodiment is described hereinafter. Note that the same structures are denoted by the same reference numerals, and description thereof is omitted.

Figure 8:
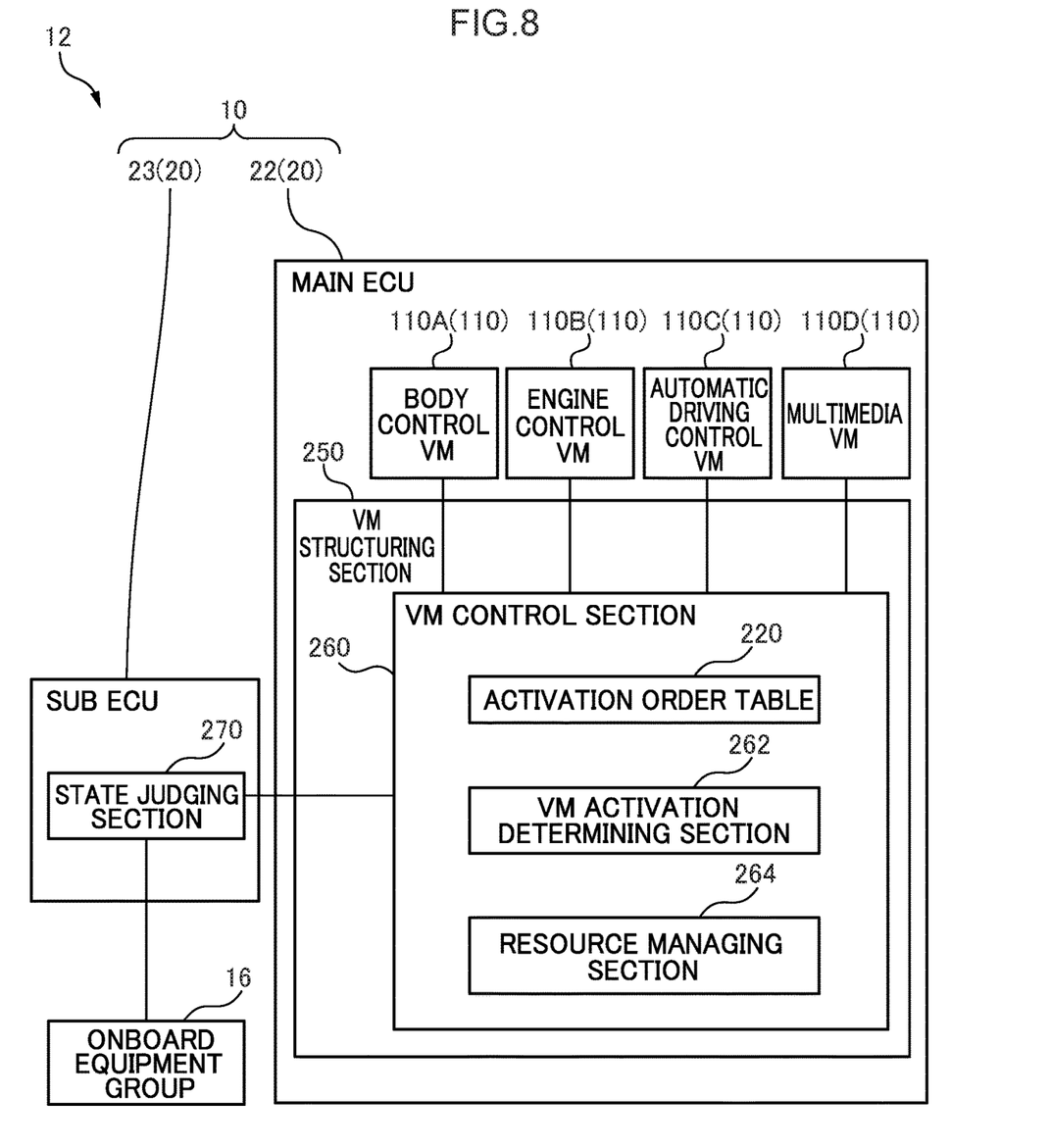
FIG. 8 is a block drawing showing an example of the functional structures of the vehicle of a third embodiment.

As shown in FIG. 8, the control device 10 of the present embodiment includes a main ECU 22 and a sub ECU 23 as the ECUs 20. In the present embodiment, the respective VMs 110, the VM structuring section 250 and the VM control section 260 are provided at the main ECU 22, and the state judging section 270 is provided at the sub ECU 23. The VM control section 260 is notified of the state of the vehicle 12, which is judged at the state judging section 270, by communication between the ECUs 20 (e.g., CAN).

Operation and effects that are similar to those of the first embodiment can be obtained in the present embodiment as well.

Fourth Embodiment

The fourth embodiment differs from the first embodiment with regard to the point that the VM control section 260 and the state judging section 270 are respectively provided at other ECUs 20. The point that differs from the first embodiment is described hereinafter. Note that the same structures are denoted by the same reference numerals, and description thereof is omitted.

Figure 9:
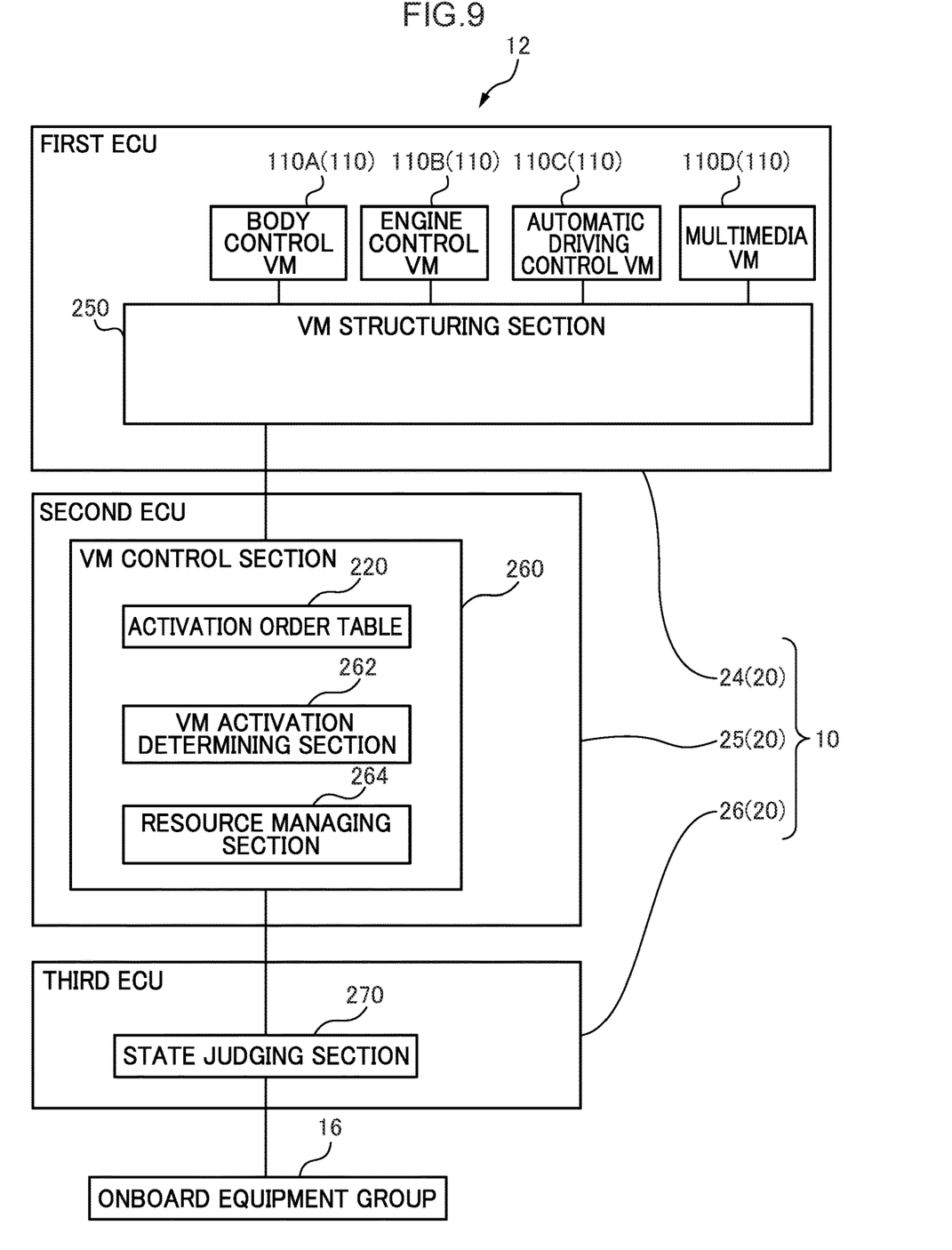
FIG. 9 is a block drawing showing an example of the functional structures of the vehicle of a fourth embodiment.

As shown in FIG. 9, the control device 10 of the present embodiment includes a first ECU 24, a second ECU 25 and a third ECU 26 as the ECUs 20. In the present embodiment, the respective VMs 110 and the VM structuring section 250 are provided at the first ECU 24, and the VM control section 260 is provided at the second ECU 25, and the state judging section 270 is provided at the third ECU 26.

In the present embodiment, synchronization of the information of the respective VMs 110 is devised at the RAM 20C of the first ECU 24 and the RAM 20C of the second ECU 25, in order for the information relating to the respective VMs 110 (the body control VM 110A, the engine control VM 110B, the automatic driving control VM 110C and the multimedia VM 110D) to be shared by the VM structuring section 250 and the VM control section 260. The VM control section 260 is notified of the state of the vehicle 12, which is judged at the state judging section 270, by communication between the ECUs 20 (e.g., CAN). Further, the instructing, from the VM control section 260 to the VM structuring section 250, of activation and ending of the VMs 110 is carried out by communication between the ECUs 20 (e.g., CAN).

Operation and effects that are similar to those of the first embodiment can be obtained in the present embodiment as well.

Notes

Note that, although the two states that are state A and state B are provided for the vehicle 12 of the above-described embodiment (see FIG. 4), the present disclosure is not limited to this, and three or more states may be provided.

Note that any of various types of processors other than the CPU 20A may execute the processings that the CPU 20A executes by reading-in software (the programs) in the above-described embodiments. Examples of processors in this case include PLDs (Programmable Logic Devices) whose circuit structure can be changed after production such as FPGAs (Field-Programmable Gate Arrays) and the like, or dedicated electrical circuits that are processors having circuit structures that are designed for the sole purpose of executing specific processings such as ASICs (Application Specific Integrated Circuits) and the like, or the like. Further, the respective processings may be executed by one of these various types of processors, or may be executed by combining two or more of the same type or different types of processors (e.g., plural FPGAs, or a combination of a CPU and an FPGA, or the like). The hardware structures of these various types of processors are, more concretely, electrical circuits that combine circuit elements such as semiconductor elements and the like.

Further, the above-described embodiments describe forms in which the programs are stored in advance (are installed in) a computer-readable non-transitory recording medium. For example, at the ECU 20, the control program 200 is stored in advance in the ROM 20B. However, the present disclosure is not limited to this, and the respective programs may be stored in a storage such as an HDD (Hard Disk Drive), an SSD (Solid State Drive) or the like. Further, the respective programs may be provided in forms of being recorded on a non-transitory recording medium such as a CD-ROM (Compact Disk Read Only Memory), a DVD-ROM (Digital Versatile Disk Read Only Memory), a USB (Universal Serial Bus) memory, or the like. Further, the respective programs may be in forms such that they are downloaded from an external device via a network.

The flow of the processings that are described in the above embodiments is an example, and unnecessary steps may be omitted, new steps may be added, or the order of processings may be rearranged, within a scope that does not depart from the gist of the present disclosure.

An object of the present disclosure is to provide a vehicle control device, a vehicle control method, and a recording medium storing a vehicle control program that suppress the delay of a VM, which is important in controlling a vehicle, by switching the VM whose activation is to be prioritized, in accordance with the state of the vehicle.

A first aspect of the present disclosure is a vehicle control device that includes: a memory; and a processor that is connected to the memory, wherein the processor is configured to judge a state of a vehicle, structure a plurality of VMs (Virtual Machines) that control equipment installed in the vehicle, and in accordance with the state of the vehicle, switch an order of carrying out activation or stoppage of the plurality of VMs.

In the vehicle control device of the first aspect, the plural VMs are structured by the VM structuring section. The equipment that are installed in the vehicle are controlled by the respective VMs. In this vehicle control device, the order, in which the VM control section carries out activation or stoppage of the plural VMs, is switched in accordance with the state of the vehicle that is judged by the judging section. Due thereto, a VM that is important in controlling the vehicle can be activated prioritarily. Namely, in accordance with this vehicle control device, a VM whose activation is to be prioritized is switched in accordance with the state of the vehicle, and, due thereto, delay of the VM that is important to the control of the vehicle can be suppressed.

A second aspect of the present disclosure is the vehicle control device of the first aspect, wherein the processor is configured to, in a case in which there exists another VM that depends on one VM, activate the another VM after activating the one VM, and stop the one VM after stopping the another VM.

The vehicle control device of the second aspect carries out control such that, in a case in which there exists another VM that depends on one VM, the another VM is not activated while the one VM is still in a stopped state. Namely, in this vehicle control device, in a case in which one VM is to be activated or stopped, because the another VM is stopped, the activation time or deactivation time for the one VM can be shortened.

The third aspect of the present disclosure is the vehicle control device of the first or the second aspect, wherein the processor is configured to, in a case in which a VM that is currently activated is to be ended and a VM that is currently stopped is to be activated, decrease resources of the VM that is currently activated and is to be ended, and increase the resources of the VM that is currently stopped before enabling activation of the VM.

In the vehicle control device of the third aspect, processing that ends a VM that is currently activated is postponed, and the resources of the VM structuring section for that VM are reduced, and the resources of the VM that is to be activated henceforth are increased. Due thereto, processings relating to the activation of a VM, which is currently stopped, being affected by the processings of a VM, whose ending is postponed, is suppressed. Namely, in accordance with this vehicle control device, the activation time of a VM that is to be activated can be shortened.

The fourth aspect of the present disclosure is the vehicle control device of the third aspect, wherein the processor is configured to, in a case in which a VM relating to running the vehicle is to be activated, increase the resources after activation of the VM starts, and, after activation is completed, decrease the resources to a usual usage amount.

In accordance with the vehicle control device of the fourth aspect, the resources, which have been assigned to a VM for which processings relating to ending have been postponed, can be distributed to the VM that relates to running the vehicle and that is to be activated henceforth. Accordingly, in accordance with this vehicle control device, the activation time of a VM relating to running the vehicle can be shortened.

The fifth aspect of the present disclosure is the vehicle control device of the third or the fourth aspect, wherein the processor is configured to, in a case of activating a VM that does not affect running the vehicle, after starting activation of the VM, execute activation or stoppage of the VM that is next in order, without waiting for completion of activation of the VM that does not affect running the vehicle.

In the vehicle control device of the fifth aspect, in a case of activating a VM that does not affect running the vehicle, the VM control section executes activation or stoppage relating to the VM that is next in order, without waiting for completion of activation of the VM that does not affect running the vehicle. Namely, in accordance with this vehicle control device, for a VM that does not affect running the vehicle, processing is carried out in parallel with the processing of another VM, and due thereto, the time until all of the processings are completed can be shortened.

The sixth aspect of the present disclosure is a vehicle control method that includes: by a processor, judging a state of a vehicle; structuring a plurality of VMs that control equipment installed in the vehicle; and in accordance with the state of the vehicle, switching an order of carrying out activation or stoppage of the plurality of VMs.

The vehicle control method of the sixth aspect structures plural VMs, and, at the respective VMs, controls equipment that are installed in the vehicle. This vehicle control method executes a switching processing that switches the order of carrying out activation or stoppage of the plural VMs, in accordance with the judged state of the vehicle. Due thereto, a VM that is important in controlling the vehicle can be activated prioritarily. Namely, in accordance with this vehicle control method, a VM whose activation is to be prioritized is switched in accordance with the state of the vehicle, and, due thereto, delay of the VM that is important to the control of the vehicle can be suppressed.

The seventh aspect of the present disclosure is a non-transitory recording medium storing a program that is executable by a computer to perform vehicle control processings, the vehicle control processings includes: judging a state of a vehicle; structuring a plurality of VMs that control equipment installed in the vehicle; and in accordance with the state of the vehicle, switching an order of carrying out activation or stoppage of the plurality of VMs.

The control program of the seventh aspect structures plural VMs, and, at the respective VMs, controls equipment that are installed in the vehicle. The computer executes switching processing that switches the order of carrying out activation or stoppage of the plural VMs, in accordance with the judged state of the vehicle. Due thereto, a VM that is important in controlling the vehicle can be activated prioritarily. Namely, in accordance with this control program, a VM whose activation is to be prioritized is switched in accordance with the state of the vehicle, and, due thereto, delay of the VM that is important to the control of the vehicle can be suppressed.

In accordance with the present disclosure, delay of a VM, which is important in controlling the vehicle, can be suppressed by switching the VM whose activation is to be prioritized, in accordance with the state of the vehicle.

What is claimed is:

1. A vehicle control device comprising:
a memory; and
a processor that is connected to the memory,
wherein the processor is configured to
judge a state of a vehicle, the states including at least a first state in which the vehicle is parked while a passenger is within the vehicle, and a second state in which the vehicle is driving, and
organize and control, using a hypervisor function, a plurality of VMs (Virtual Machines) that in turn control equipment installed in the vehicle, the processor thereby controls an order of activating or stopping the plurality of VMs, and
when the processor determines that the state of the vehicle has changed, switch an order of carrying out activation or stoppage of the plurality of VMs, based on: (i) a prescribed activation order of the plurality of VMs, and (ii) a determination of whether each VM is to be activated or stopped in the judged state,
wherein the plurality of VMs include at least a body control VM, an engine control VM, a multimedia VM, and an automatic driving control VM,
wherein the engine control VM and body control VM have a high priority level, the automatic driving control VM has a medium priority level, and the multimedia VM has a low priority level, the high priority level being higher than the medium priority level, and the medium priority level being higher than the low priority level,
wherein in the first state the body control VM and multimedia VM are activated and the engine control VM and automatic driving control VM are stopped, and in the second state, the engine control VM, automatic driving control VM, body control VM, and multimedia control VM are activated,
wherein the prescribed activation order includes at least a dependence such that the automatic driving control VM cannot be started until after the engine control VM has been started.

2. The vehicle control device of claim 1, wherein the processor is configured to, in a case in which there exists another VM, of the plurality of VMs, that depends on a third VM, activate the another VM after activating the third VM, and stop the third VM after stopping the another VM.

3. The vehicle control device of claim 1, wherein the processor is configured to, in a case in which a first VM of the plurality of VMs that is currently activated is to be ended and a second VM that is currently stopped is to be activated, decrease resources of the first VM that is currently activated and is to be ended, and increase the resources of the second VM that is currently stopped before enabling activation of the second VM.

4. The vehicle control device of claim 3, wherein the processor is configured to, in a case in which a fourth VM, of the plurality of VMs, relating to running the vehicle is to be activate, increase the resources after activation of the fourth VM starts, and, after activation is completed, decrease the resources to a default usage amount.

5. The vehicle control device of claim 3, wherein the processor is configured to, in a case of activating a fifth VM, of the plurality of VMs, that does not affect running the vehicle, after starting activation of the fifth VM, execute activation or stoppage of a sixth VM that is next in order, without waiting for completion of activation of the fifth VM that does not affect running the vehicle.

6. A vehicle control method comprising:
by a processor, judging a state of a vehicle, the state including at least a first state in which the vehicle is parked while a passenger is within the vehicle, and a second state in which the vehicle is driving;
organize and control, by a hypervisor function, a plurality of VMs that control equipment installed in the vehicle, the processor thereby controls an order of activating or stopping the plurality of VMs; and
when the processor determines that the state of the vehicle has changed, switching an order of carrying out activation or stoppage of the plurality of VMs, based on: (i) a prescribed activation order of the plurality of VMs, and (ii) a determination of whether each VM is to be activated or stopped in the judged state,
wherein the plurality of VMs include at least a body control VM, an engine control VM, a multimedia VM, and an automatic driving control VM,
wherein the engine control VM and body control VM have a high priority level, the automatic driving control VM has a medium priority level, and the multimedia VM has a low priority level, the high priority level being higher than the medium priority level, and the medium priority level being higher than the low priority level,
wherein in the first state the body control VM and multimedia VM are activated and the engine control VM and automatic driving control VM are stopped, and in the second state, the engine control VM, automatic driving control VM, body control VM, and multimedia control VM are activated,
wherein the prescribed activation order includes at least a dependence such that the automatic driving control VM cannot be started until after the engine control VM has been started.

7. The vehicle control method of claim 6, wherein, in a case in which there exists another VM, of the plurality of VMs, that depends on a second VM, the another VM is activated after activating the second VM, and the second VM is stopped after stopping the another VM.

8. The vehicle control method of claim 6, wherein, in a case in which a third VM that is currently activated is to be ended and a fourth VM that is currently stopped is to be activated, resources of the third VM that is currently activated and is to be ended is decreased, and the resources of the third VM that is currently stopped is increased before enabling activation of the fourth VM.

9. The vehicle control method of claim 8, wherein, in a case in which a fifth VM relating to running the vehicle is to be activated, the resources are increased after activation of the fifth VM starts, and, after activation is completed, the resources are decreased to a default usage amount.

10. The vehicle control method of claim 8, wherein, in a case of activating a sixth VM that does not affect running the vehicle, after starting activation of the sixth VM, activation or stoppage of a seventh VM that is next in order is executed, without waiting for completion of activation of the sixth VM that does not affect running the vehicle.

11. A non-transitory recording medium storing a program that is executable by a computer to perform vehicle control processings, the vehicle control processings comprising:
judging a state of a vehicle, the states including at least a first state in which the vehicle is parked while a passenger is within the vehicle, and a second state in which the vehicle is driving;
organize and control, by a hypervisor function, a plurality of VMs that control equipment installed in the vehicle, the processor vehicle control processing thereby controls an order of activating or stopping the plurality of VMs; and when the computer determines that the state of the vehicle has changed, switching an order of carrying out activation or stoppage of the plurality of VMs based on: (i) a prescribed activation order of the plurality of VMs, and (ii) a determination of whether each VM is to be activated or stopped in the judged state, wherein the plurality of VMs include at least a body control VM, an engine control VM, a multimedia VM, and an automatic driving control VM, wherein the engine control VM and body control VM have a high priority level, the automatic driving control VM has a medium priority level, and the multimedia VM has a low priority level, the high priority level being higher than the medium priority level, and the medium priority level being higher than the low priority level, wherein in the first state the body control VM and multimedia VM are activated and the engine control VM and automatic driving control VM are stopped, and in the second state, the engine control VM, automatic driving control VM, body control VM, and multimedia control VM are activated, wherein the prescribed activation order includes at least a dependence such that the automatic driving control VM cannot be started until after the engine control VM has been started.

12. The non-transitory recording medium of claim 11, wherein, in a case in which there exists another a VM that depends on one a second VM, of the plurality of VMs, the another VM is activated after activating the second VM, and the second VM is stopped after stopping the another VM.

13. The non-transitory recording medium of claim 11, wherein, in a case in which a third VM that is currently activated is to be ended and a fourth VM that is currently stopped is to be activated, resources of the third VM that is currently activated and is to be ended is decreased, and the resources of the fourth VM that is currently stopped is increased before enabling activation of the VM.

14. The non-transitory recording medium of claim 13, wherein, in a case in which a fifth VM relating to running the vehicle is to be activated, the resources are increased after activation of the VM starts, and, after activation is completed, the resources are decreased to a default usage amount.

15. The non-transitory recording medium of claim 13, wherein, in a case of activating a sixth VM that does not affect running the vehicle, after starting activation of the sixth VM, activation or stoppage of a seventh VM that is next in order is executed, without waiting for completion of activation of the sixth VM that does not affect running the vehicle.

* * * * *